(12) United States Patent
Venkatraman et al.

(10) Patent No.: US 8,473,916 B2
(45) Date of Patent: Jun. 25, 2013

(54) METHOD AND SYSTEM FOR PROVIDING A TESTING FRAMEWORK

(75) Inventors: Srinivas Venkatraman, Chennai (IN); Ganesh Kumar, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 13/013,317

(22) Filed: Jan. 25, 2011

(65) Prior Publication Data

US 2012/0192153 A1 Jul. 26, 2012

(51) Int. Cl.
*G06F 9/44* (2006.01)

(52) U.S. Cl.
USPC .............................. 717/124; 717/126; 717/128

(58) Field of Classification Search
None
See application file for complete search history.

(56) References Cited

U.S. PATENT DOCUMENTS

| | | | | |
|---|---|---|---|---|
| 7,299,382 B2* | 11/2007 | Jorapur | ............. | 717/124 |
| 7,895,565 B1* | 2/2011 | Hudgons et al. | ............. | 717/106 |
| 8,191,048 B2* | 5/2012 | Parthasarathy et al. | ....... | 717/124 |
| 8,276,123 B1* | 9/2012 | Deng et al. | ............. | 717/124 |
| 8,359,581 B2* | 1/2013 | Ortiz | ............. | 717/128 |
| 8,381,192 B1* | 2/2013 | Drewry et al. | ............. | 717/124 |
| 2003/0097650 A1* | 5/2003 | Bahrs et al. | ............. | 717/124 |
| 2006/0184918 A1* | 8/2006 | Rosaria et al. | ............. | 717/124 |
| 2007/0028217 A1* | 2/2007 | Mishra et al. | ............. | 717/124 |
| 2007/0079291 A1* | 4/2007 | Roth | ............. | 717/124 |
| 2007/0124726 A1* | 5/2007 | Qureshi et al. | ............. | 717/124 |
| 2007/0240116 A1* | 10/2007 | Bangel et al. | ............. | 717/124 |
| 2009/0313606 A1* | 12/2009 | Geppert et al. | ............. | 717/124 |
| 2010/0131928 A1* | 5/2010 | Parthasarathy et al. | ....... | 717/126 |
| 2010/0146489 A1* | 6/2010 | Ortiz | ............. | 717/128 |
| 2010/0229150 A1* | 9/2010 | Stone et al. | ............. | 717/124 |
| 2010/0257211 A1* | 10/2010 | Glowacki et al. | ............. | 707/803 |
| 2011/0010685 A1* | 1/2011 | Sureka et al. | ............. | 717/126 |
| 2011/0246540 A1* | 10/2011 | Salman et al. | ............. | 707/812 |
| 2012/0221304 A1* | 8/2012 | Zecheria et al. | ............. | 703/6 |
| 2012/0266142 A1* | 10/2012 | Bokhari | ............. | 717/127 |

OTHER PUBLICATIONS

Mei et al., "Test Case Prioritization for Regression Testing of Service-Oriented Business Applications", WWW'09, Apr. 20-24, 2009, Madrid, Spain, pp. 901-910; <http://www2009.org/proceedings/pdf/p901.pdf>.*

Salama et al., "A Methodology for Managing Database and Code Changes in a Regression Testing Framework", 2012 ACM, pp. 117-120; <http://dl.acm.org/results.cfm?h=1&cfid=279207207&cftoken=25653171>.*

Zhang et al., "Regression Test Generation Approach Based on Tree=Structured Analysis", 2010 IEEE, pp. 244-249; <http://ieeexplore.ieee.org/stamp/stamp.jsp?tp=&arnumber=5476640>.*

* cited by examiner

*Primary Examiner* — Thuy Dao
*Assistant Examiner* — Ben C Wang

(57) ABSTRACT

An approach for enabling maintenance of a test bed for use in executing software testing is described. A test management platform collects production data relating to execution of a prior release of an application within a production environment. The test management platform extracts unique messages from the collected production data to create a test bed including a plurality of test cases. Input messages to be processed by the application are generated based on a determination of which unique messages require a change based on a current release of the application.

14 Claims, 9 Drawing Sheets

FIG. 3A
300

| AddStagingVideoOrder 301 | | | | | | | |
|---|---|---|---|---|---|---|---|
| | ADDRESS_GROUP 303 | | | | | | |
| | | SERVICE_ADDRESS 305 | | | | | |
| | | | CITY 307 | HOUSE 309 | STATE 311 | STREET 313 | ZIP 315 |
| AddStagingVideoOrder | ADDRESS_GROUP | SERVICE_ADDRESS | KELLER | 1448 | TX | BACON DR | 76248 |
| AddStagingVideoOrder | ADDRESS_GROUP | SERVICE_ADDRESS | HUNTINGTON BH | 9082 | CA | ALOHA DR | 92646 |
| AddStagingVideoOrder | ADDRESS_GROUP | SERVICE_ADDRESS | KELLER | 330 | TX | PINE TREE | 76248 |
| AddStagingVideoOrder | ADDRESS_GROUP | SERVICE_ADDRESS | DENTON | 4516 | TX | BAYTREE AVE | 76208 |

METHOD AND SYSTEM FOR PROVIDING A TESTING FRAMEWORK

BACKGROUND INFORMATION

When building an updated version of a software system (e.g., by removing faults, changing or adding functionality, porting the system to a new platform or extending interoperability), the testing team may also inadvertently change existing functionality. Sometimes, even small changes can produce unforeseen effects that lead to new failures. For example, a data element added to an array to fix another problem may cause a failure when the array is used in other contexts, or porting the software to a new platform may expose a latent fault in creating and modifying temporary files. Regression testing is a technique that seeks to address this issue by uncovering software errors through partial, incremental retesting of the modified program. By way of this approach, the appropriate minimum suite of tests needed to adequately cover the affected change is selected. Unfortunately, for large or complex software projects, there may be thousands of test cases in the test bed, where any change in the project requires the updating and maintenance of several test cases.

Based on the foregoing, there is a need for an effective, automated approach to maintaining a test bed for use in executing software testing.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are diagrams of a spreadsheet populated with one or more unique input messages and data points as acquired from production log data associated with a test case of a testing system 111, according to various embodiments;

DESCRIPTION OF THE PREFERRED EMBODIMENT

An apparatus, method and software for enabling maintenance of a test bed for use in executing software testing is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to a test bed, it is contemplated that these embodiments have applicability to any data protocols, methodologies or systems for performing software testing, verification, functional execution analysis and the like, including testing performed concurrent with software development (i.e., coding), after development, or a combination thereof.

Figure 1:
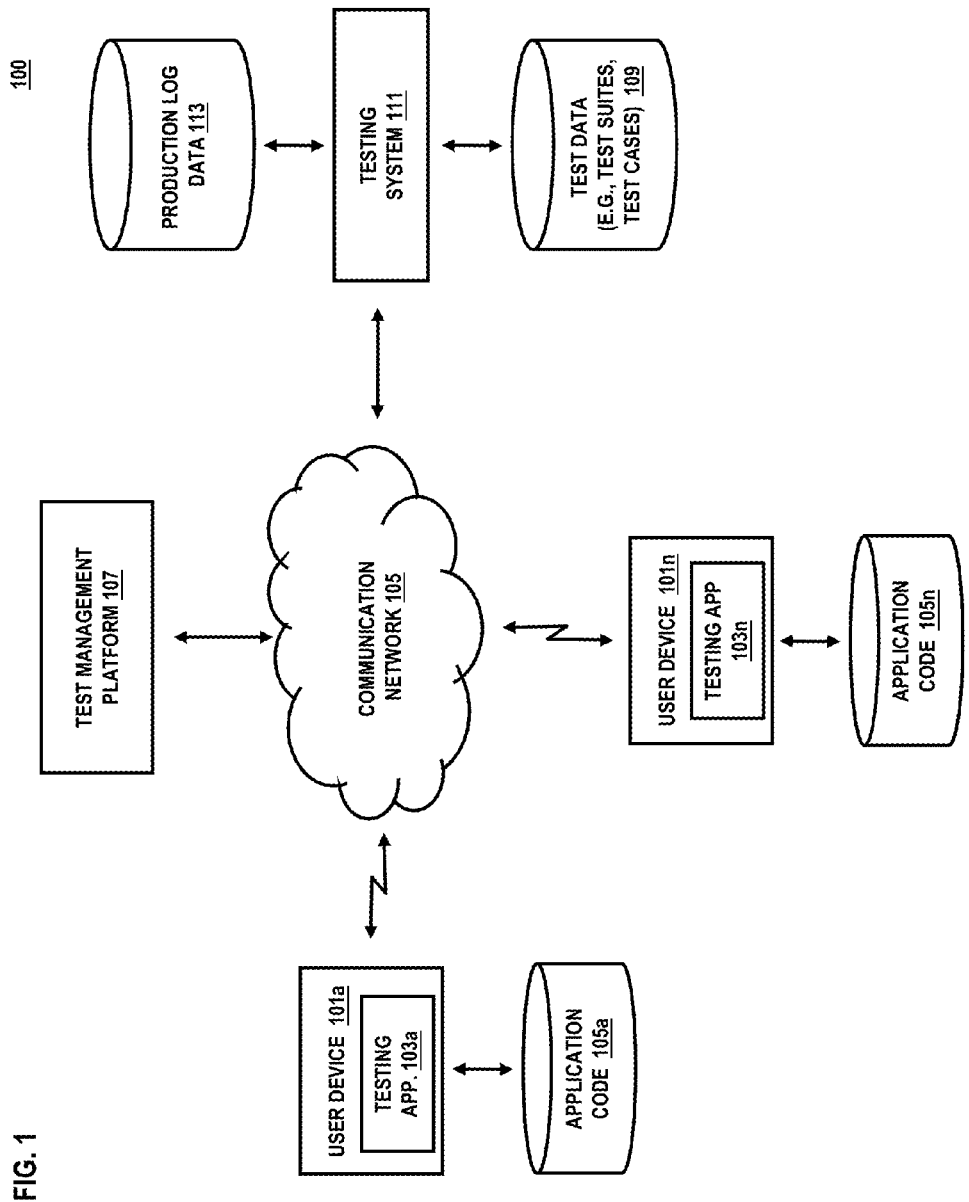
FIG. 1 is a diagram of a system for enabling maintenance of a test bed for use in executing software testing, according to one embodiment.

FIG. 1 is a diagram of a system for enabling maintenance of a test bed for use in executing software testing, according to one embodiment. By way of example, a test management platform 107 may be executed in connection with a testing system 111 for providing a software developer, tester, quality assurance analyst or other user involved in the development of software with a means of readily updating or modifying test data 113. As will be discussed further with respect to FIG. 2, the test management platform 107 utilizes various instances of production log data 113, as maintained by the testing system 111 responsive to the execution of application code 105, to generate updated test data 109. The test data 109 may include one or more data items or instructions for testing and validating the behavior of a given software application or process, or specific features thereof as implemented as application code 105. Also, the test data 113 may be organized into one or more test beds, also referred to as test suites, which may further encompass one or more test cases, for enabling a means of coordinated testing of software applications.

A "test bed" or "test suite" in certain embodiments, pertains to one or more sets of test data 109 provided to the testing system 111 for enabling rigorous, transparent and replicable testing of application code 105. By way of example, test beds provide a testing environment for enabling testing of particular modules or components of execution of software (e.g., functions, classes, or libraries as encompassed by the application code 105) in an isolated fashion. As mentioned previously, the test bed may execute one or more test cases, which, in certain embodiments may be implemented as one or more scripts for executing the various steps associated with the specific function under test. A "test case" encompasses a set of conditions or variables that may be assessed by a tester to determine whether an application or software system under test is working correctly or not. The mechanism for determining whether the application has passed or failed could be based on observed execution of a requirement, an expected use case, or in other instances a heuristic. Hence, in certain embodiments, test cases may be implemented as a "test script" for automating requirement, use case or heuristic execution, and made to pass one or more inputs (arguments) to the specific functions, classes, or libraries under test for generating a passing or failing behavioral response. Alternatively, the test steps can be stored in a word processor document, spreadsheet, database or other common repository.

For illustration purposes, a "test case" is to be taken to be synonymous with a "test script" when applied within the context of a test bed or software production/test environment.

Large test beds, and hence more complex test cases/scripts, may also contain prerequisite states, steps and descriptions. It is noted, therefore, that when implemented as a script, test cases may include various instructions for invoking the function, feature or application under test (e.g., application code 105a-105b), may pass one or more input data/arguments and may encode one or more data elements as comments, descriptions or output data. The test script may be modified to include programming concepts, such as referencing common function libraries, using variables, loops, and branching to increase efficiency of execution of the script.

In a typical software development environment, testing of the various features of an application is critical to the functional and commercial success of the product. Within the context of the software development lifecycle, a software development company will typically employ a team of developers who generate the application code (the program) that enables the various features and functions of the application. In addition, a dedicated team of testers, quality analysts, project managers and other users may also be involved in the overall development process, specifically for ensuring product feasibility, debugging, defect free operation and quality control. Testing systems (e.g., testing system 111) are commonly used in coordinating the testing effort amongst the various users involved in the development process.

In certain embodiments, a particular method of testing known as regression testing focuses on finding defects after a major application code change has occurred—i.e., a software build based on the compilation of application code 105a-105n from collaborating developers. By way of example, regression testing is a process of uncovering software regressions, or old bugs that have come back pursuant to the recent application code changes. Such regressions occur whenever software functionality that was previously working correctly stops working as intended. Typically, regressions occur as an unintended consequence of program changes, when the newly developed part of the software collides with the previously existing application code. Consequently, a testing system 111 may be employed to perform regression testing in connection with a test bed. As mentioned previously, the test bed may be implemented as one or more test cases that are intended to account for the various requirements and/or desired execution of the application code.

For large or complex software projects, there may be thousands of test cases in the test suite or test bed. Consequently, any change in the project, including changes to the application code under test, the requirement to be tested, etc., requires the updating and maintenance of several test cases. As the regression test bed is typically maintained manually by the tester or testing team, each test case that requires a change must be manually modified. This can become quite a daunting and tedious task for the testing team, and can be even further exacerbated in cases where multiple application code modifications are required. Due to the interdependency of functionality and features, a change to one test case may inherently require a change to several other related test cases. Unfortunately, there is no convenient way for the tester or testing team to reduce the maintenance process of the test bed. Furthermore, while there are various testing systems and tools available for automating the regression or unit testing process, there is still no convenient solution for automatically generating a test bed for use in enabling execution of a testing system in response to a required application code change.

To address this issue, the system 100 of FIG. 1 provides a mechanism for enabling test data 109, including test beds or individual test cases, to be readily modified and maintained automatically to support software testing through execution of a testing system 111. By way of example, the system 100 includes a test management platform 107 for operating in conjunction with the testing system 111. The test management platform 107 enables the entire test bed, and particularly those test cases required to be adapted or modified in response to a current release of application code 105 under test, to be developed from production log data 113 as generated from execution of one or more test cases. The platform 107, among various other capabilities, identifies a delta (e.g., data point difference, variation) in functionality between the previous release of the application code and the current release, then applies the determined delta (functional adaptation) as datapoints to the test cases in the test bed. Once applied, the newly generated test cases may be executed by the testing system 111 with respect to the current release of the application code in the testing or quality assurance environment.

In certain embodiments, a "testing system" 111 pertains to any software, hardware or firmware based system for use in managing and executing software testing, validation and quality. Through execution of the testing system 111, users are able to perform testing of application code 105. It is noted that during the software development process, the application code may be incrementally adapted, compiled and built to render execution of certain features and functions, all of which require testing. The testing system 111 is implemented to coordinate the testing process and enable users to readily identify defects. Depending on the needs of the development team, the testing system 111 may be configured for manual execution, automated execution, or a combination thereof. By way of example, when the test procedures are carried out manually, the application code 105 is tested based on data input provided directly by the user as they interact with the test system 111 and application code 105 under test. Alternatively, the test system 111 may be configured for automated execution, wherein the application code 105 under test is automatically passed data values without necessitating user interaction. In either case, the testing system 111 is able to pass results data and other feedback to a respective user via their testing application (app) 103a-103n.

By way of example, the testing system 111 may be configured for use by one or more users (e.g., testers, quality analysts, software developers) via testing applications (app) 103 operable by a given user's computing device 101. The testing application 103 provides a user interface for enabling execution of the testing system 111, including the loading or updating of test data 109, retrieval and presentment of production data 113, the starting and stopping of tests, etc. While implementation approaches may vary, the testing system 111 may be configured to interact with multiple users via a communication network 105, where each user operates their own testing application 103a-103n from their respective user device 101a-101n. Under this approach, the testing system 111 may accommodate simultaneous testing of various features of a given software application, i.e., specific sets or subsets of application code 105a-105n, which is suitable for supporting large scale testing or concurrent testing by different users across an organization. It is noted that such concurrency may be accommodated by the testing system 111 and respective testing applications 103a-103n to support multi-user or team collaboration in rapid development, pair based development, iterative development or agile software development environments. Alternatively, the testing system 111 may be utilized to support post production testing, i.e., testing that occurs after the requirements have been defined and the coding process have been completed.

With respect to FIG. 1, the application code 105a-105n (also referred to herein as the "application," "software" "program") under test by the testing system 111 is shown to be accessed by a respective user device 101a-101n. Under this scenario, each user may test the same or different application code 105a-105n accordingly from their respective user devices 101a-101n in connection with the testing system 111. It is noted, however, that the application code 105 may also be uploaded to and maintained directly by the testing system 111, such that an instance of the application code 105a-105n for a given user (tester) is executed by a respective user device 101 via their testing application 103 at the time of test. The testing system 111 may therefore, be configured to access the functions, libraries, classes, compilers and other run-time components necessary for execution of the application code 105. The user devices 101a-101n and testing system 111 may access a mutual application code repository or other shared data source.

In various embodiments, user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), Smartphone or any combination thereof. It is also contemplated that the user devices 101a-101n can support any type of interface for supporting the presentment of data views respective to the testing application 103a-103n. In general, user devices 101a-101n may feature a browser or portal application for enabling network communication and access to the testing system 111, associated production log data 113 and test data (e.g., test beds, test cases) 109. In addition, user devices 101a-101n may facilitate various input means for passing test variables or modifying test cases, including touch screen capability, keyboard and keypad data entry, voice-based input mechanisms and the like. Any known and future implementations of user devices 101 are applicable.

In various embodiments, communication network 105 may be any suitable wireline and/or wireless network, and be managed by one or more service providers. For example, network 105 may include an integrated services digital network (ISDN) or other like network. In the case of a wireless network configuration, these networks may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. In addition, communication network 105 may be implemented with respect to a public switched telephone network (PSTN) or embody or include portions of a signaling system 7 (SS7) network, or other suitable infrastructure to support control and signaling functions.

In general, the test case may include various parameters for classifying the test to be performed relative to the application code under test, including a test case identifier (ID), test case description, test step or order of execution reference number (e.g., steps corresponding to the sequence of the use case), related requirement(s) data, depth of execution data, test category, author, etc. Execution of a test case, by the testing system 111 or tool, results in the generation of one or more production logs. In certain embodiments, a "production log" or "test log" is a collection of raw output data captured during execution of a test bed and/or one or more test cases. The production log data 113 provides a detailed, time stamped record that serves both as verification that a set of tests cases were executed as well as details regarding the outcome of the tests performed. Hence, data included in a production log 113 may include a pass/fail indication, an execution result/output, additional details relating to any anomalous or erroneous conditions detected and a description of the event logged. In addition, the production log data 113 may indicate various logistic, semantic and contextual data that may be useful for enabling post-execution analysis of the performed tests, including the date and time stamp of when the event (test result/output) occurred, details of where the production log is stored and how to access to it and some reference to the specific test beds or cases (e.g., test data 109) for which the production log was generated. It is noted that the production log data may be maintained (with delimiters) as a text file, flat file, ASCII file, word processing document, spreadsheet or the like.

Also, depending on system requirements or preferences, the production log may be generated according to various document encoding or markup languages, including extensive markup language (XML), Standard Generalized Markup Language (SGML), JavaScript Object Notation (JSON) or the like. Moreover, the schema may be adapted by the testing team accordingly to affect generation of the production log data 113. An exemplary XML schema for generating a production log 113 pertaining to a specific function of application code 105, referenced as "AddStagingVideoOrder," is shown below. For illustration purposes, it may be assumed the exemplary application code (AddStagingVideoOrder), shown in Table 1, pertains to a previously released function and/or software feature for staging and coordinating the ordering of video data and/or services by a service provider in response to a customer request. It is noted, however, that schemas will vary depending on the application code being tested, the requirements associated with the test, etc.

TABLE 1

```
<AddStagingVideoOrder>
 <ORDER_HEADER>
  <APPOINTMENT_END_TIME>17:00</APPOINTMENT_END_TIME>
  <BILLING_TN>8174314373</BILLING_TN>
  <ACCOUNT_TYPE>NRES</ACCOUNT_TYPE>
  <REGION_ID>A</REGION_ID>
  <DISPATCH_COEFFICIENT>2.1</DISPATCH_COEFFICIENT>
  <DATA_HEADER></DATA_HEADER>
  <ORDER_TYPE>N</ORDER_TYPE>
  <CUSTOMER_NAME>APR TC7SMC WR21525</CUSTOMER_NAME>
  <APPOINTMENT_START_TIME>08:00</APPOINTMENT_START_TIME>
  <EAST_WEST_IND>W</EAST_WEST_IND>
  <IS_RETRIEVAL_ORDER_EXISTS>N</IS_RETRIEVAL_ORDER_EXISTS>
  <CUSTOMER_NAME>APR TC7SMC WR21525</CUSTOMER_NAME>
  <SERVICE_CLASS>RESIDENCE</SERVICE_CLASS>
  <CUSTOMER_ACCT_ID>A002021018</CUSTOMER_ACCT_ID>
  <APPOINTMENT_CODE>Z</APPOINTMENT_CODE>
  <TIME_ZONE>EST</TIME_ZONE>
  <APPOINTMENT_DATE>04/03/2008</APPOINTMENT_DATE>
  <ORDER_CREATE_TIME>11:49</ORDER_CREATE_TIME>
  <MASTER_ORDER_NUMBER>0S0451348</MASTER_ORDER_NUMBER>
  <VERSION_NUMBER>1</VERSION_NUMBER>
  <ORDER_NUMBER>NDIGITALORDER</ORDER_NUMBER>
  <ORDER_CREATE_DATE>04/03/2008</ORDER_CREATE_DATE>
  <DUE_DATE>04/03/2008</DUE_DATE>
  <ORIGINATING_SYSTEM>GUI</ORIGINATING_SYSTEM>
  <CUSTOMER_CONTACT_PHONE>8139786720</CUSTOMER_CONTACT_PHONE>
 </ORDER_HEADER>
 <ADDRESS_GROUP>
  <SERVICE_ADDRESS>
   <ZIP>76248</ZIP>
   <CITY>KELLER</CITY>
   <STREET>PINE TREE CIR S</STREET>
   <STATE>TX</STATE>
   <HOUSE>330</HOUSE>
  </SERVICE_ADDRESS>
  <VIDEO_RECORDS>
   <SELF_INSTALL>N</SELF_INSTALL>
   <MAX_CPE_OVERRIDE>N</MAX_CPE_OVERRIDE>
   <FEATURE_RECORD>
    <IPPV_ENABLED>N</IPPV_ENABLED>
    <VIP_CODE>V</VIP_CODE>
    <ADDL_LINE_FLAG>N</ADDL_LINE_FLAG>
    <CREDIT_LIMIT>150</CREDIT_LIMIT>
    <VOD_ENABLED>N</VOD_ENABLED>
    <IOSC_PARAMETER_LIST>
     <PARAMETER_TYPE>ROUTER</PARAMETER_TYPE>
     <IOSC_FIELD_VALUE>1</IOSC_FIELD_VALUE>
     <IOSC_FIELD_NAME>FEKXM</IOSC_FIELD_NAME>
    </IOSC_PARAMETER_LIST>
    <IOSC_PARAMETER_LIST>
     <PARAMETER_TYPE>STB</PARAMETER_TYPE>
     <IOSC_FIELD_VALUE>1</IOSC_FIELD_VALUE>
     <IOSC_FIELD_NAME>FEKM4</IOSC_FIELD_NAME>
    </IOSC_PARAMETER_LIST>
    <IOSC_PARAMETER_LIST>
      <PARAMETER_TYPE>FEATURE</PARAMETER_TYPE>
      <IOSC_FIELD_VALUE>1</IOSC_FIELD_VALUE>
      <IOSC_FIELD_NAME>AS3FQ</IOSC_FIELD_NAME>
    </IOSC_PARAMETER_LIST>
    <IOSC_PARAMETER_LIST>
      <PARAMETER_TYPE>VOD_PKG</PARAMETER_TYPE>
      <IOSC_FIELD_VALUE>1</IOSC_FIELD_VALUE>
      <IOSC_FIELD_NAME>G9709</IOSC_FIELD_NAME>
    </IOSC_PARAMETER_LIST>
    <IOSC_PARAMETER_LIST>
      <PARAMETER_TYPE>VOD_PKG</PARAMETER_TYPE>
      <IOSC_FIELD_VALUE>1</IOSC_FIELD_VALUE>
      <IOSC_FIELD_NAME>G9710</IOSC_FIELD_NAME>
    </IOSC_PARAMETER_LIST>
    <IOSC_PARAMETER_LIST>
      <PARAMETER_TYPE>VOD_PKG</PARAMETER_TYPE>
      <IOSC_FIELD_VALUE>1</IOSC_FIELD_VALUE>
      <IOSC_FIELD_NAME>G9713/<IOSC_FIELD_NAME>
    </IOSC_PARAMETER_LIST>
```

TABLE 1-continued

```
        <IOSC_PARAMETER_LIST>
          <PARAMETER_TYPE>PACKAGE</PARAMETER_TYPE>
          <IOSC_FIELD_VALUE>1</IOSC_FIELD_VALUE>
          <IOSC_FIELD_NAME>Y6322</IOSC_FIELD_NAME>
        </IOSC_PARAMETER_LIST>
        <IOSC_PARAMETER_LIST>
          <PARAMETER_TYPE>PACKAGE/<PARAMETER_TYPE>
          <IOSC_FIELD_VALUE>1</IOSC_FIELD_VALUE>
          <IOSC_FIELD_NAME>Y6320</IOSC_FIELD_NAME>
        </IOSC_PARAMETER_LIST>
        <IOSC_PARAMETER_LIST>
          <PARAMETER_TYPE>PACKAGE</PARAMETER_TYPE>
          <IOSC_FIELD_VALUE>1</IOSC_FIELD_VALUE>
          <IOSC_FIELD_NAME>Y6317</IOSC_FIELD_NAME>
        </IOSC_PARAMETER_LIST>
        <IOSC_PARAMETER_LIST>
          <PARAMETER_TYPE>FEATURE</PARAMETER_TYPE>
          <IOSC_FIELD_VALUE>1</IOSC_FIELD_VALUE>
          <IOSC_FIELD_NAME>G9998</IOSC_FIELD_NAME>
        </IOSC_PARAMETER_LIST>
        <IOSC_PARAMETER_LIST>
          <PARAMETER_TYPE>VOD_PKG</PARAMETER_TYPE>
          <IOSC_FIELD_VALUE>1</IOSC_FIELD_VALUE>
          <IOSC_FIELD_NAME>G9706</IOSC_FIELD_NAME>
        </IOSC_PARAMETER_LIST>
        <IOSC_PARAMETER_LIST>
          <PARAMETER_TYPE>VOD_PKG</PARAMETER_TYPE>
          <IOSC_FIELD_VALUE>1</IOSC_FIELD_VALUE>
          <IOSC_FIELD_NAME>G9707</IOSC_FIELD_NAME>
        </IOSC_PARAMETER_LIST>
        <IOSC_PARAMETER_LIST>
          <PARAMETER_TYPE>VOD_PKG</PARAMETER_TYPE>
          <IOSC_FIELD_VALUE>1</IOSC_FIELD_VALUE>
          <IOSC_FIELD_NAME>G9708</IOSC_FIELD_NAME>
        </IOSC_PARAMETER_LIST>
        <FEATURE_ACTION_CODE>I</FEATURE_ACTION_CODE>
      </FEATURE_RECORD>
      <LINE_RECORD>
        <FTTP_FLAG>Y</FTTP_FLAG>
        <SERVICE_TYPE>AS3FP</SERVICE_TYPE>
        <ACTION_CODE>I</ACTION_CODE>
        <CIRCUIT_ID>44/VAXA/034024/       /VZTX</CIRCUIT_ID>
      </LINE_RECORD>
      <CUSTOMER_VIEWING_CODE>CONSUMER</CUSTOMER_VIEWING_CODE>
      <CSGM_TOGGLE>Y</CSGM_TOGGLE>
    </VIDEO_RECORDS>
    <ACO>C1E</ACO>
    <WIRE_CENTER>752</WIRE_CENTER>
  </ADDRESS_GROUP>
  <ORDER_SAVE_TYPE>1</ORDER_SAVE_TYPE>
</AddStagingVideoOrder>
```

The schema of Table 1 presents many different data points representative of various defined data types. It is noted that certain data points (e.g., those highlighted in bold lettering above) such as the value corresponding to the CUSTOMER_ACCT_ID for representing a unique customer account identifier, CUSTOMER_NAME for representing the contact name of a given customer, MASTER_ORDER_NUMBER for representing a unique order number and CUSTOMER_CONTACT_PHONE for representing a unique telephone contact number, may be deemed to be exclusive or unique. In certain embodiments, a "unique data point" pertains to any information useful for distinguishing, identifying or classifying a given item or data type, such as a customer, product, equipment, event, service, feature, transaction, etc., in relation to the application code (e.g., AddStagingVideoOrder) under test. Moreover, a data point may be deemed unique singularly or when considered in connection with other information, i.e., an input message. Of note, a unique data point may be used to cross reference other information. By way of example, a customer phone number, customer identifier value, service identifier value, etc. may be referenced and associated with a specific customer profile or account file.

As shown, the schema includes various defined attributes, including functions, input messages, data types and data points. By way of example, the various attributes are encoded as tags for entry into the production log 113. The schema is developed according to the following format (in Table 2):

TABLE 2

```
<FUNCTION_NAME>
    <input message 1>
        <data type 1> data point </data type 1>
        <data type 2> data point </data type 2>
        ....
        ....
    </input message 1>
    ....
    ....
</FUNCTION_NAME>
```

The function (e.g., AddStagingVideoOrder) being encoded within the production log 113 is represented by the FUNC- TION_NAME tag. Each function may include multiple different input messages as represented by the <input message> tag, each message conveying a particular aspect of the function. A message may be deemed unique when it is considered in connection with a unique data point. Still further, each message may include multiple different data types for encoding specific data points, wherein this case, the data types are represented as <data type 1> and <data type 2), and the specific value of the data type is represented as data point. By way of example, in the following syntax as expressed in the AddStagingVideoOrder schema above: <CUSTOMER_ACCOUNT_ID>A002021018</CUSTOMER_ACCOUNT_ID>, the data type being encoded (tagged) in the production log 113 is CUSTOMER_ACCOUNT_ID for representing a unique customer identifier value. The corresponding data point is A002021018.

It is noted the production log data 215 may be generated, and furthermore, adapted to include specific input messages of any format. Because the production log data is derived from execution of a test case (e.g., test script) in connection with a given feature or function of the software (e.g., AddStagingVideoOrder), the logs serve as a template or roadmap for enabling a tester to understand how the results/outcomes of application code under test were derived. By way of example, the production log data 113 may be replayed by the testing system 111 (e.g., in the production environment) to reproduce the results/outcomes derived from execution of the test case. Under this scenario, the test case is also effectively reproduced based on the data contained within the production log. It is noted, therefore, that the test management platform 107 may be configured to operate in connection with a testing system 111 for enabling production log data related to a previous release of software to be adapted for influencing the development of test cases related to a new release of the same software. For example, in certain embodiments, messages may be constructed and added to the production log 113 by the test management platform 107 in response to new release requirements—i.e., production log data 113 generated respective to a prior software build may be adapted to include new or additional data points and/or messages. More regarding the functionality of the test management platform 107 is described with respect to FIG. 2.

Figure 2:
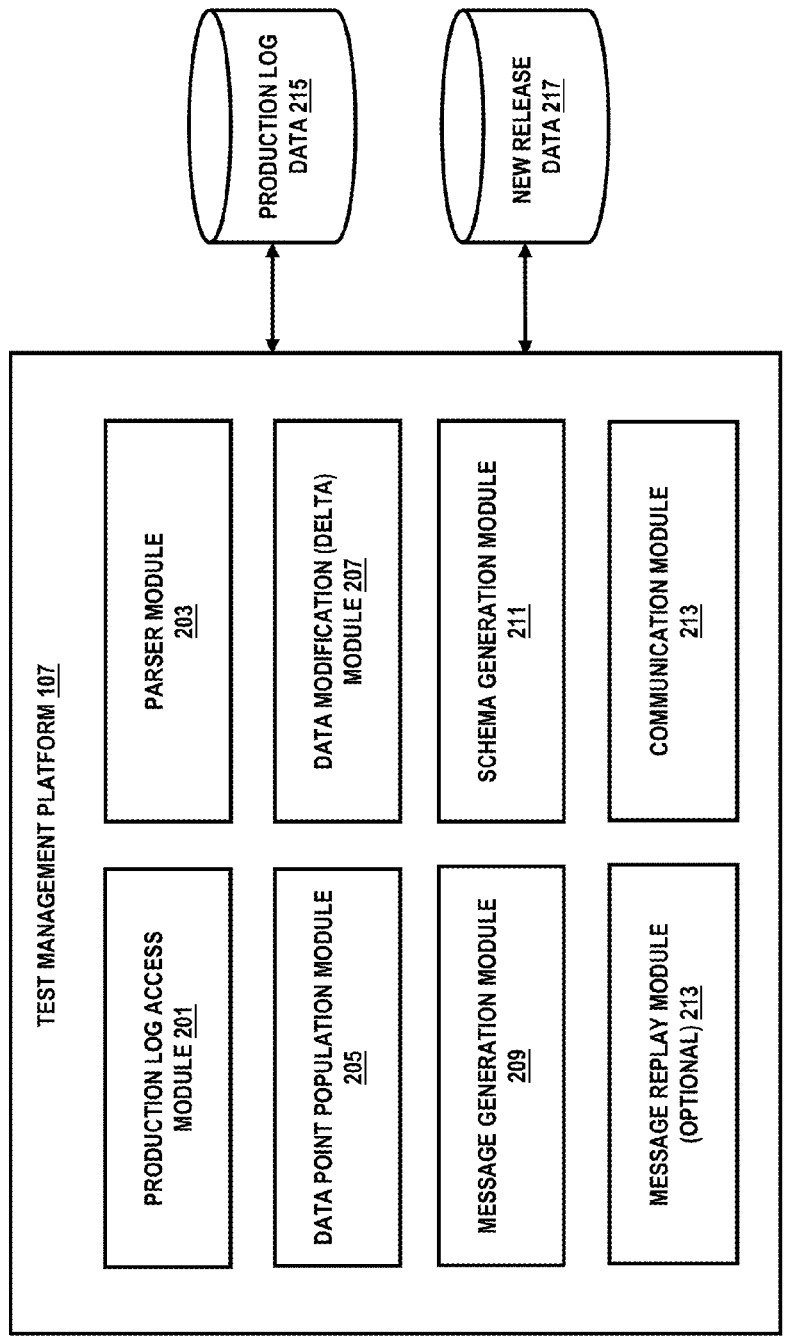
FIG. 2 is a diagram of a test management platform for maintaining a test bed for use in executing software testing, according to one embodiment.

FIG. 2 is a diagram of a test management platform for maintaining a test bed for use in executing software testing, according to one embodiment. In this example, the test management platform 107 may be accessed as a hosted service by a software development organization (e.g., testing team) via the communication network 105 for operation in connection with their testing system 111. Alternatively, the platform 107 may be implemented as an internal solution maintained by the software development organization. The test management platform 107 includes various executable modules for performing one or more computing, data processing and network based instructions that in combination provide a means of facilitating the maintenance and generation of test data 109 for operating with respect to a testing system 111. Also, it is noted that the modules encompassing the test management platform 107 can be implemented in hardware, firmware, software, or a combination thereof. By way of example, the test management platform 107 may include a production log access module 201, parser module 203, data point population module 205, data modification module 207, message generation module 209, schema generation module 211, message replay module 213 and communication module 213. In addition, the test management platform 107 also accesses production logs associated with test beds executed by the testing system 111 from a production log database 215 (same as database 113). It is noted, therefore, that the test management platform 107 may have access to current release data as well as prior generated production log data 113.

In one embodiment, a communication module 213 enables formation of a session over a network 105 between the test management platform 107, the testing system 111 and the various test applications configured for interaction with the system 111. Also, various protocols and data sharing techniques for enabling collaborative execution between a user device 101 (e.g., mobile devices, laptops, Smartphones, tablet computers, desktop computers) and the test management platform 107 over the communication network is provided by the communication module 213.

In one embodiment, the production log access module 201 accesses production log data, such as that generated during previous releases or builds of application code 105. As mentioned previously, the production log data is generated responsive to execution of application code under test. The production log access module 201 is configured to collect production log data for a designated period of time (e.g., a month). Hence, the production log access module 201 interacts with the testing system 111 to retrieve production log data 113 as it is generated or according to a designated frequency.

Operating in connection with the production log access module 201, in certain embodiments, the parser module 203 strips the input messages and associated data points from the production log data 215 as stored. In addition, the parser module 203 may be implemented in accordance with matching, identification, relational or other logic for identifying and subsequently extracting the unique datapoints (unique messages) from the production log data. By way of example, the parser module 203 may be configured to perform data extraction in accordance with a data extraction model or other means. Under this scenario, the parser module 203 determines from among the plurality of messages and corresponding data points, those which are unique in nature.

Of note, the production log access module 201 is configured to acquire production log data 113 from the testing system 111 at a frequency suitable for enabling the parser module 203 to identify a multitude of unique datapoints. By way of example, with respect to a given set of application code (e.g., function or feature) under test, more unique data points are accumulated over an extended period of time as more functional interaction occurs. The testing team or other interested party may adjust the frequency or schedule at which the test management platform 107 accumulates production log data 215.

In certain embodiments, a data point population module 205 populates a temporary data structure or data file for maintaining the messages and data points stripped from the production log data 113 by the parser module 203, including the unique data points. The data structure or data file may be populated with the multiple data points, messages and input types associated with the production log data or only those deemed unique by the parser module 203. As mentioned previously, the data structure or file may be configured as a spreadsheet or any other report and/or data format for encoding data as an array of cells. The data point population module 205 translates the data points presented in the production log data into a data structure (e.g., spreadsheet) of a given format. In this manner, the data points may be populated such that specific delimiters and other aspects of the production log data 113 are maintained in the spreadsheet. In other instances, the data point population module 205 may be configured to enable customized formatting of data points or cells for population into a spreadsheet or other suitable data structure, including line properties, cell properties, margins, etc.

Figure 3B:
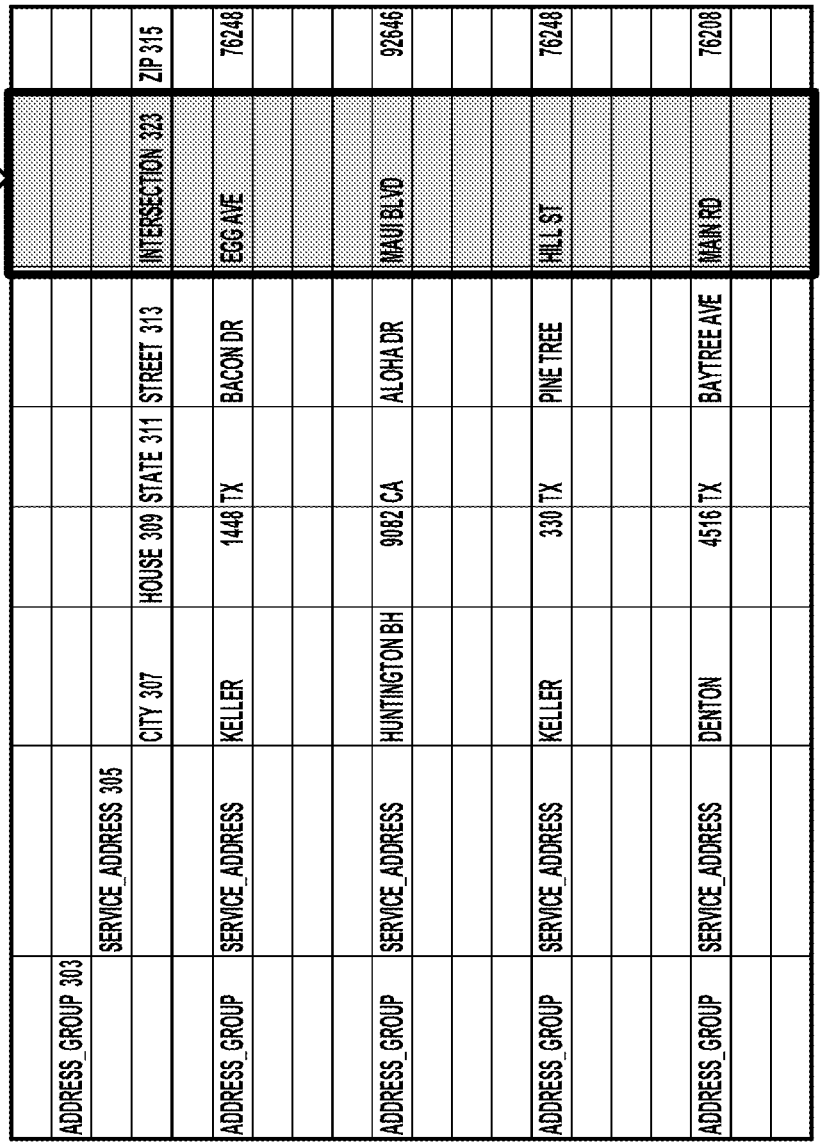

FIGS. 3A and 3B are diagrams of a spreadsheet populated with one or more unique input messages and data points as acquired from production log data associated with a test case of a testing system 111, according to various embodiments. The spreadsheets 300 and 318 correspond to the above described XML schema for generating production log data 113 associated with a test case for the AddStagingVideoOrder function. By way of example, the spreadsheets 300 and 318 present only a limited subset of input messages, data types and their corresponding data points as specified within the overall XML schema; particularly, the shaded section of the schema, implemented as follows (Table 3):

BH, Denton), while columns 309-315 present various data points corresponding to House numbers (1448, 9082, 330, 4516), State designations (TX, CA), Street names (Bacon Dr, Aloha Dr, Pinetree, Baytree Ave) and Zip Code (76248, 92646, 76248, 76208) numbers respectively. Hence, as mentioned previously, the parser module 203 may detect such variation and/or contrast in values for determining which messages, data types and corresponding data points are unique. Also, it is noted that the variation between data types and data points facilitates cross referencing of the data against other information (e.g., customer profile) for lookup or information linking purposes.

In certain embodiments, a data modification module and message generation module operate upon the spreadsheets containing various input messages and data points to enable the subtraction, editing or addition of new data. By way of example, the data modification module 207 and message generation module 209 enable adaptation of the spreadsheets generated by the data point generation module 205. The adaptation process is performed on the spreadsheet 300 derived from the production log data 215 corresponding to the prior release of software. Hence, prior data points, data types and/or messages are adapted by the data modification module 207 to meet new software release messaging requirements.

TABLE 3

```
<AddStagingVideoOrder>                      //Function
  ...
  <ADDRESS_GROUP>                           //Input Message
    <SERVICE_ADDRESS>                       //Secondary Input Message
      <ZIP>76248</ZIP>                      //Data type Zip, data point 76248
      <CITY>KELLER</CITY>                   //Data type City, data point Keller
      <STREET>PINE TREE CIR S</STREET>      ...
      <STATE>TX</STATE>                     ...
      <HOUSE>330</HOUSE>                    ...
    </SERVICE_ADDRESS>                      //Close Secondary Input Message
    ...
  <ADDRESS_GROUP>                           //Close Input Message
  ...
</AddStagingVideoOrder>                     //Close Function
```

For illustration purposes, comments are shown along with the schema for providing a general description of a specific aspect of the schema. Under this scenario, the FUNCTION_NAME AddStagingVideoOrder as indicated in the schema is maintained as a column heading in cell 301, with associated data points presented within the column. Input message ADDRESS_GROUP and sub message SERVICE_ADDRESS are also maintained as column headings corresponding to cells 303 and 305, with associated data points presented within those columns. Of note, the data points populated with respect to columns 301-305 are not unique as there is no distinct or variable data contained within the columns. Additional information must be associated with these data fields to enable uniqueness.

Columns 307-315 for maintaining data points corresponding to data types City, House, State, Street and Zip do provide contrasting or variable information. When taken in combination with columns 301-305, the columns 307-315 present rows of information that may be determined to provide unique data. Under this scenario, column 307 presents data points representative of different cities (Keller, Huntington Based on the requirements being coded for the current release, which may include data point or message additions, subtractions or edits, the data modification module 207 identifies which of the unique messages corresponding to a unique set of datapoints require a change. The data modification module 207 determines a delta or change in functionality between the previous release of the application code and the updated/new release. The delta in functionality between the updated and prior release is based in part on a difference in data points and/or messages for the prior release versus a set of data points, data types and/or messages for implementation of the updated/new release functionality. The data points, data types and/or messages required for enabling new functionality with respect to a given set of application code under test is maintained by the platform 107 as new release data 217. For illustration purposes, it is assumed the data points and/or messages for implementing the new functionality (new release data 217) are also maintained in a data structure, i.e., spreadsheet, as are the data points, data types and/or messages generated by the data point population module 205 for reflecting prior release functionality.

The message generation module 209 features logic for enabling the generation and addition of custom messages to the spreadsheet based on the data points maintained as new release data 217 and the delta determined by the data modification module 207. FIG. 3B presents an exemplary spreadsheet 318 that is adapted to include messages and/or data points corresponding to new software release requirements. For illustration purposes, the spreadsheet 318 is presented from the perspective of a use case for adding new functionality to the prior release of AddStagingVideoOrder.

Under this scenario, the data modification module 207 determines a delta (e.g., discrepancy, difference, variation) between the messages, data types and/or data points associated with the prior version of the AddStagingVideoOrder feature and updated version as specified in the new release data 217. For example, the data modification module 207 determines that the new release data 217 indicates the presence of an additional data type, namely INTERSECTION. This data type is intended to maintain data points representing a nearest intersection for the corresponding CITY 307, HOUSE 309, STATE 311 and STREET 313 values. Furthermore, the data modification module 207 detects that the placement of this new data type and its corresponding data points relative to the prior data—i.e., that the new data type is to be positioned/formatted for inclusion between the STREET and ZIP data types and values. Based on this determination, the message generation module 209 adapts the spreadsheet 300 associated with the prior version of AddStagingVideoOrder to include data type INTERSECTION, maintained as a column heading corresponding to cells 323. In addition, data points Egg Ave, Maui Blvd, Hill St, and Main Rd are presented in association with the column with respect to the column. The additional column encompassing the INTERSECTION data type and corresponding data points is labeled in the figure, as ADDED COLUMN 331.

Spreadsheet 318 is an updated representation of the messages, data types and data points for the updated version of the AddStagingVideoOrder application code. Consequently, this change requires an updated test case for enabling appropriate regression testing by the testing system 111. While various means of maintaining such data may be employed, it is noted that spreadsheets are can be readily adapted to include additional cells (e.g., columns or rows) and other formatting as in the example above. Also, the array of data contained within spreadsheet 318 may be readily converted to a text file, XML file or other file format suitable for representing production log data. As discussed further, the production log data may be processed accordingly by the testing system 111 to generate testing data (e.g., test cases).

In certain embodiments, the schema generation module 211 converts the spreadsheet 318 into a file presenting a schema suitable for generation of production log data. By way of example, the schema generation module 211 translates the various input messages, data types and data points into a schema suitable for processing by the testing system 111. Under this scenario, the various messages as customized via addition of the input messages, data types and data points affect the execution of the testing system.

The schema generation module 211 may be implemented as a PERL script or other dynamic programming language based executable for performing seamless conversion of the data within the spreadsheet into a text file, XML file, etc. Under the scenario presented with respect to FIG. 3, where the INTERSECTION data type was added in accordance with new test case or software requirements, the corresponding schema generated by the schema generation module 211 is as follows (Table 4):

TABLE 4

```
<AddStagingVideoOrder>                              //Function
    ...
    <ADDRESS_GROUP>                                 //Input Message
        <SERVICE_ADDRESS>                           //Secondary Input Message
            <ZIP>76248</ZIP>                        //Data type Zip, data point 76248
            <CITY>KELLER</CITY>                     //Data type City, data point Keller
            <STREET>PINE TREE CIR S</STREET>        ...
            <STATE>TX</STATE>                       ...
            <HOUSE>330</HOUSE>
            <INTERSECTION>HILL ST</INTERSECTION>      //Newly added data type
        </SERVICE_ADDRESS>                          //Close Secondary Input Message
    ...
    <ADDRESS_GROUP>                                 //Close Input Message
    ...
</AddStagingVideoOrder>                             //Close Function
```

By way of example, this newly adapted schema for the AddStagingVideoOrder is presented as XML data, in the same fashion as the prior release version of the function. As depicted, the INTERSECTION data type is now included in the production log file. The newly updated production log data, having been adapted accordingly, is then transferred to the testing system 111 for execution as a test case corresponding to the newly added functionality. Alternatively, in certain embodiments, an optional message replay module 213 may operate in connection with the testing system 111 for enabling the replay of messages contained within the newly generated production log. As mentioned previously, the production log data 113 may be replayed by the testing system 111 (e.g., in the production environment) as a test case to enable execution of the testing system 111 per the updated messages.

While not shown with respect to FIG. 2, various monitoring systems may be accessed by the test management platform 107 for detecting current data traffic levels, error conditions, data exchange rates, network latencies, resource allocation levels and other conditions associated with the operation of the testing system 111. It is noted that the monitoring systems may provide feedback data to the testing platform 107 for enabling optimal transfer or execution of the updated production log data with respect to the testing system 111.

Figure 4B:
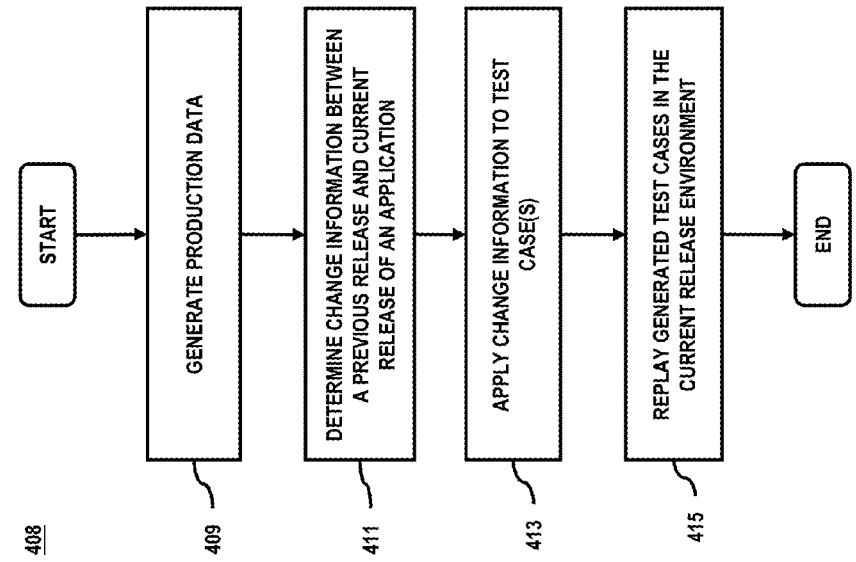
FIG. 4A-4C are flowcharts of a process for enabling maintenance of a test bed for use in executing software testing, according to various embodiments.
Figure 4A:
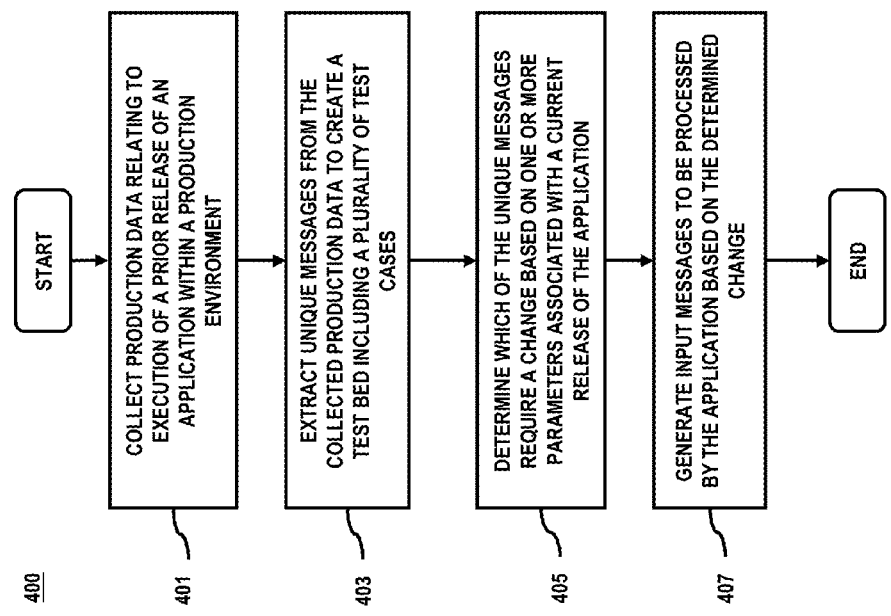
Figure 4C:
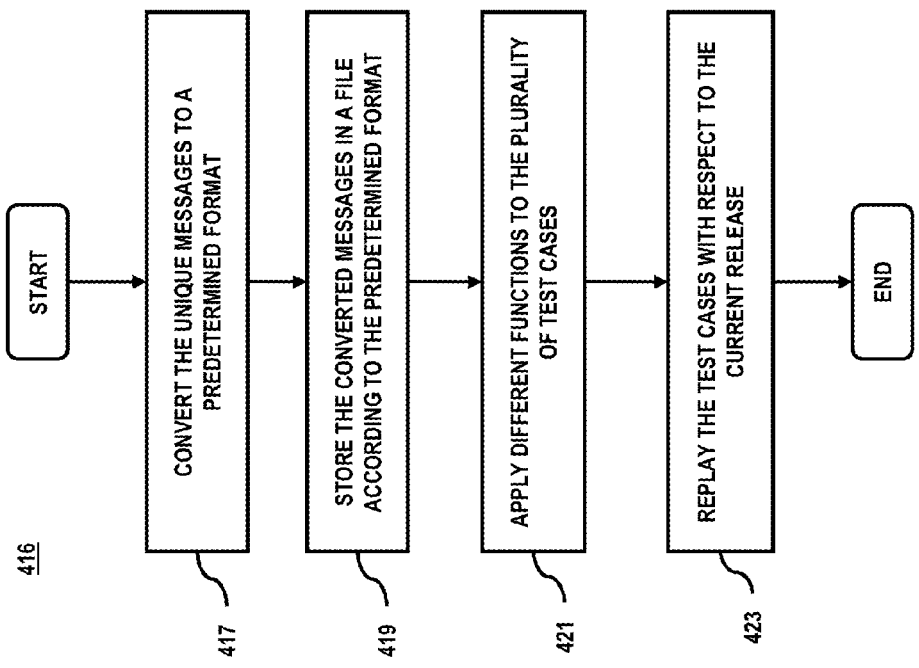

FIG. 4A-4C are flowcharts of a process for enabling maintenance of a test bed for use in executing software testing, according to various embodiments. For the purpose of illustration, the processes are described with respect to FIG. 1. It is noted that the steps of the process may be performed in any suitable order, as well as combined or separated in any suitable manner. In step 401 of process 400, the test management platform 107 collects production data relating to execution of a prior release of an application with a production environment. In step 403, the test management platform 107 extracts unique messages (e.g., unique data points) from the collected production data to create a test bed (test suite). As mentioned previously, the test bed may include one or more test cases.

In step 405, the test management platform 107 determines which of the unique messages require a change based on one or more parameters associated with a current release of the application. In step 407, input messages are generated by the test management platform 107 to be processed by the application based on the determined change. It is noted that the change corresponds to a differential between unique messages determined for the current release versus the prior release of the application.

In step 409 of process 408, production data is generated. It is noted that the production data may be produced as a result of execution of application code 105n within a production environment or alternatively, by a testing system 111 or testing application 103. In step 411, the test management platform 107 determines change information between a previous release and current release of the application. The test management platform 107 applies change information to test case(s), corresponding to step 413. In another step 415, having applied the change information, the test cases are replayed in the current release environment.

Per steps 417 and 419 of process 416, the test management platform 107 converts the unique messages to a predetermined format and stores the converted messages in a file according to the predetermined format respectively. As mentioned previously, the predetermined format may include a specified file format, data format or file structure, including a spreadsheet. Also, the file may be modified in response to the determined change. In step 421, the test management platform 107 applies different functions to the plurality of test cases. It is noted that the unique messages may correspond to the functions, such that the unique messages correspond to a difference in one or more functions between the prior release and the current release. The test cases may be replayed with respect to the current release in a production environment, per step 423.

Figure 5:
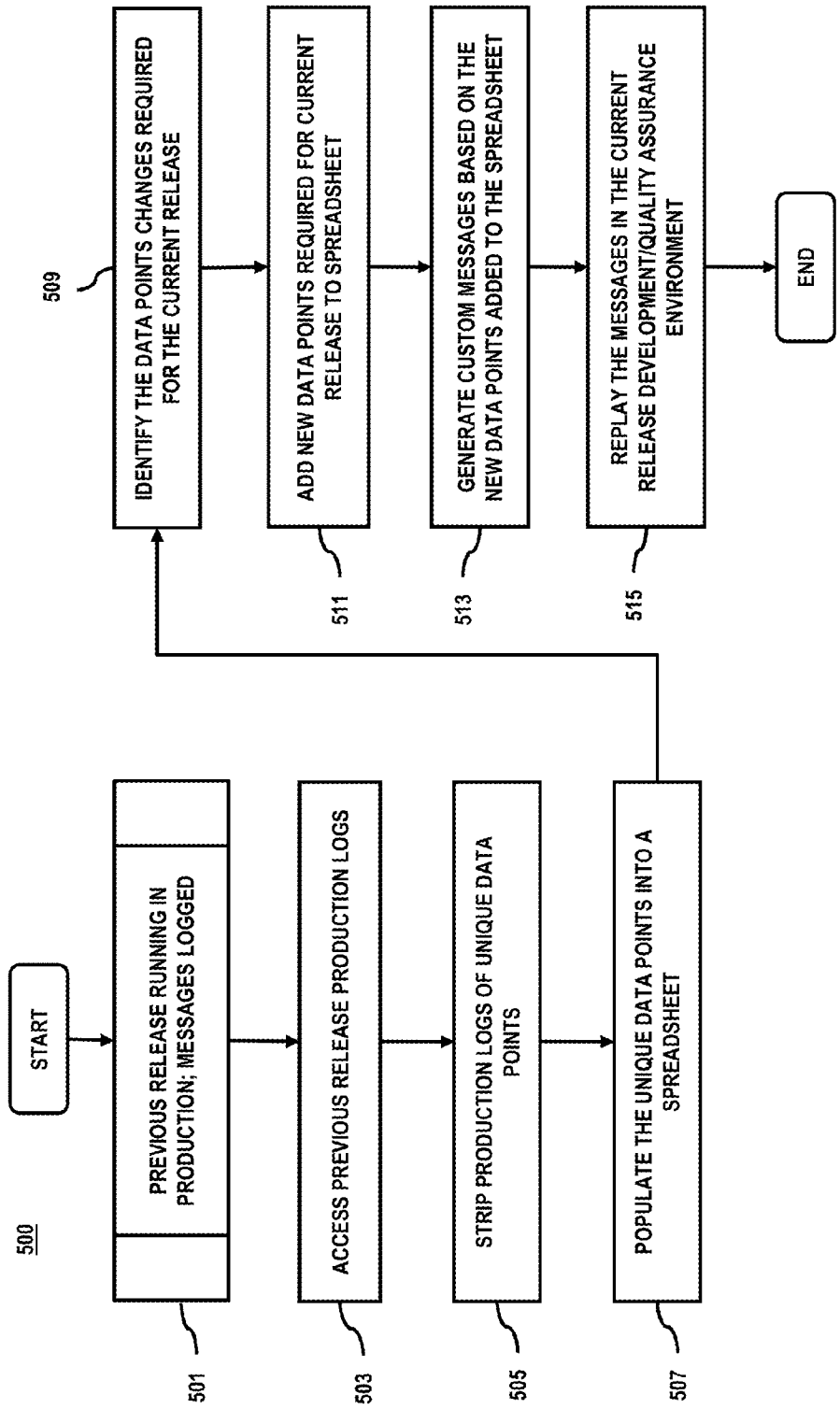
FIG. 5 is a diagram of a workflow for enabling the generation of updated test cases based on the replaying of production log data, according to one embodiment.

FIG. 5 is a diagram of a workflow for enabling the generation of updated test cases based on the replaying of production log data, according to one embodiment. It is noted that the workflow steps may be performed in any suitable order, as well as combined or separated in any suitable manner. In step 501 of process 500, a previous release of software is run in a production environment. Messages generated during this production run are logged. In another step 503, previous release production logs may be accessed, such as by the test management platform 107. Still further, in steps 505 and 507, the production log is stripped of unique data points and populated into a spreadsheet (e.g., Excel) respectively.

In workflow step 509, having processed the unique data points, changes required for the current release may be identified. New data points are added, as in step 511, for current release to the spreadsheet. In step 513, custom messages based on the new data points are added to the spreadsheet. As mentioned previously, the custom messages may relate to one or more functions for execution by a current release of the software. Per 515, the messages are replayed in the current release development/quality assurance environment.

The exemplary techniques and systems presented herein enable reduced maintainence of test cases. By way of example, production log data associated with a previous release of a function may be adapted to generate a test case for accomodating a recent release of the function. In addition, the examplary techniques and systems herein are suitable for enabling automated regression testing.

The processes described herein for providing a testing framework may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
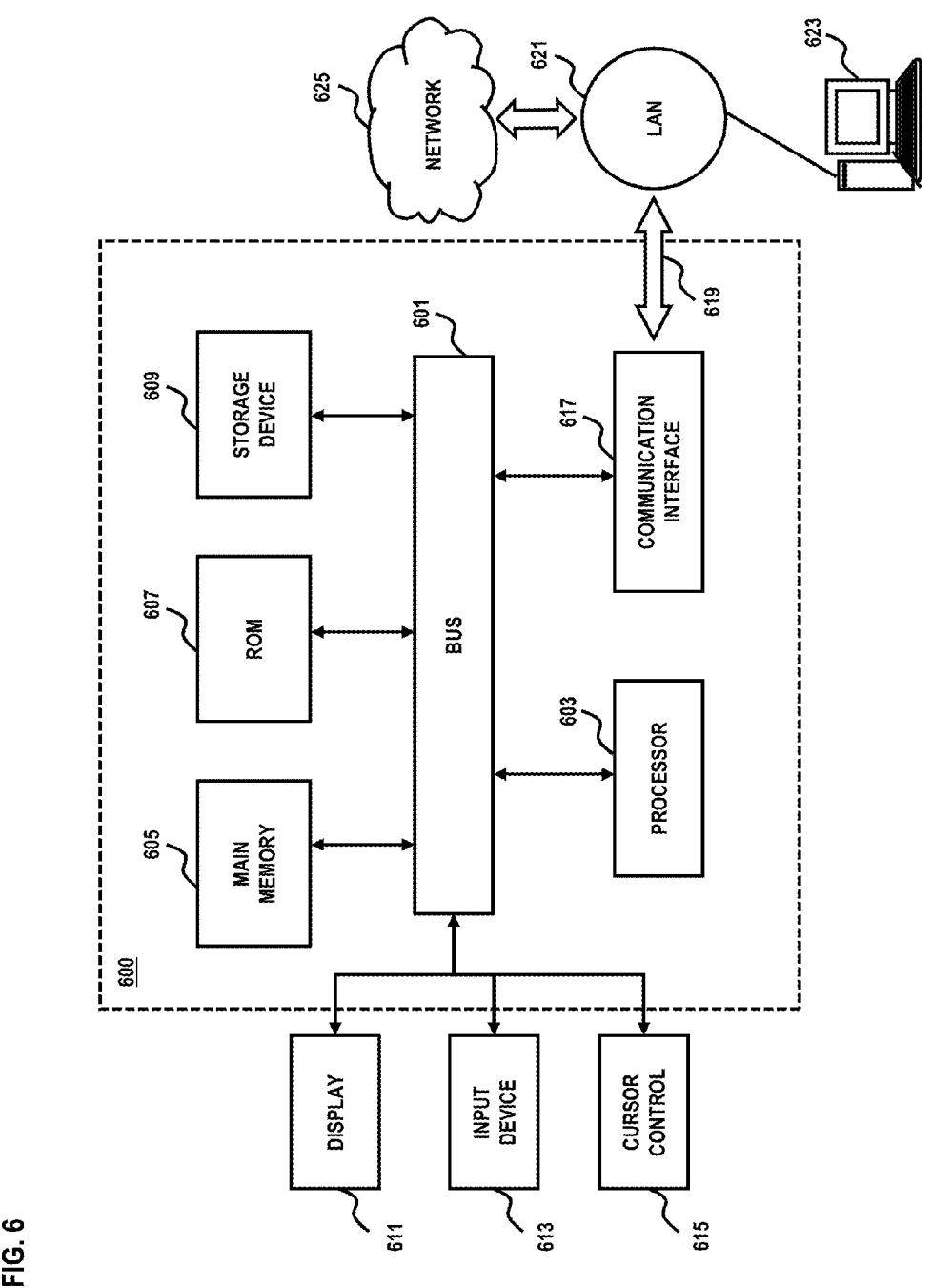
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 5, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
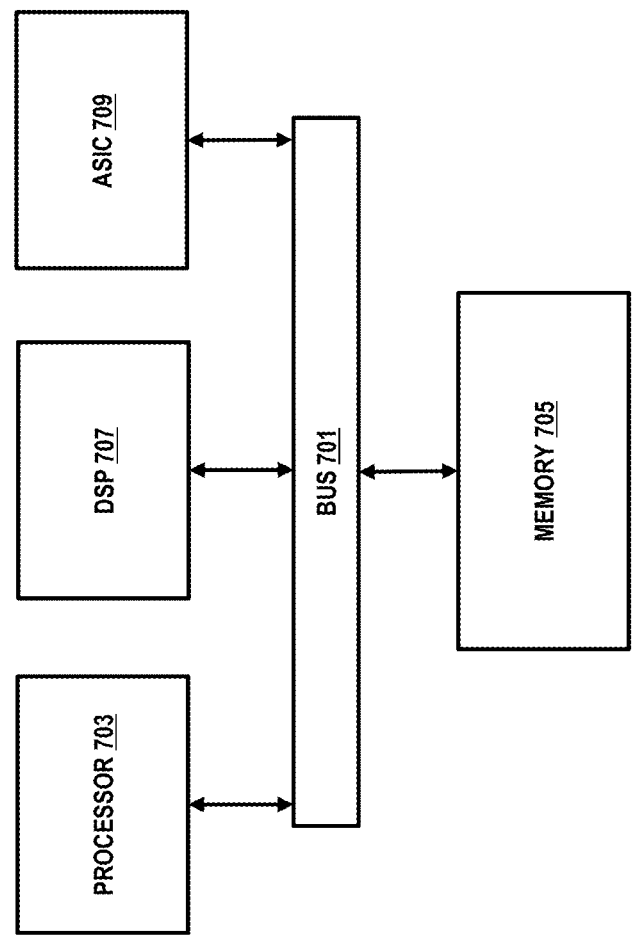
FIG. 7 is a diagram of a chip set that can be used to implement an embodiment of the invention.

FIG. 7 illustrates a chip set or chip 700 upon which an embodiment of the invention may be implemented. Chip set 700 is programmed to enable maintenance of a test bed for use in executing software testing as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of enabling maintenance of a test bed for use in executing software testing.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable maintenance of a test bed for use in executing software testing. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method executed by at least one processor comprising:
    collecting production data relating to execution of a prior release of an application within a production environment;
    parsing input messages and associated data points from the production data;
    extracting unique data points and associated unique messages from the collected production data to create a test bed including a plurality of test cases;
    determining which of the unique messages require a change based on one or more parameters associated with a current release of the application, wherein the change relates to a difference in one or more functions between the prior release and the current release;
    generating input messages to be processed by the application based on the determined change;
    applying the different functions to the plurality of test cases; and
    replaying the test cases with respect to the current release.

2. A method according to claim 1, further comprising:
    converting the unique messages to a predetermined format; and
    storing the converted messages in a file according to the predetermined format.

3. A method according to claim 2, further comprising:
    modifying the file in response to the determined change.

4. A method according to claim 1, wherein the input messages are generated according to an extensible markup language (XML).

5. A method according to claim 1, wherein the production data is collected from one or more log files and the test cases are implemented as one or more scripts.

6. An apparatus comprising:
    at least one processor; and
    at least one memory including computer program code for one or more programs,
    the at least one memory and the computer program code configured to, with the at least one processor, cause the apparatus to:
        collect production data relating to execution of a prior release of an application within a production environment;
        parse input messages and associated data points from the production data;
        extract unique data points and associated unique messages from the collected production data to create a test bed including a plurality of test cases;
        determine which of the unique messages require a change based on one or more parameters associated with a current release of the application, wherein the change relates to a difference in one or more functions between the prior release and the current release;
        generate input messages to be processed by the application based on the determined change;
    apply the different functions to the plurality of test cases; and
    replay the test cases with respect to the current release.

7. An apparatus according to claim 6, wherein the apparatus is further caused to:
    convert the unique messages to a predetermined format; and
    store the converted messages in a file according to the predetermined format.

8. An apparatus of claim 7, wherein the apparatus is further caused to:
    modify the file in response to the determined change.

9. An apparatus of claim 6, wherein the input messages are generated according to an extensible markup language (XML).

10. An apparatus of claim 6, wherein the production data is collected from one or more log files and the test cases are implemented as one or more scripts.

11. A system comprising:
- at least one processor; and
- at least one memory including computer program code for one or more programs, the at least one memory and the computer program code configured to, with the at least one processor, cause a test management platform to:
  - collect production data relating to execution of a prior release of an application within a production environment;
- parse input messages and associated data points from the production data;
  - extract unique data points and associated unique messages from the collected production data to create a test bed including a plurality of test cases;
  - determine which of the unique messages require a change based on one or more parameters associated with a current release of the application, wherein the change relates to a difference in one or more functions between the prior release and the current release;
  - determine input messages to be processed by the application based on the determined change;
  - apply the different functions to the plurality of test cases; and
  - replay the test cases with respect to the current release.

12. A system according to claim 11, wherein the test management platform is further configured to convert the unique messages to a predetermined format and store the converted messages in a file according to the predetermined format.

13. A system according to claim 12, wherein the file is modified in response to the determined change.

14. A system according to claim 11, wherein the input messages are generated according to an extensible markup language (XML), the production data is collected from one or more log files and the test cases are implemented as one or more scripts.

* * * * *